United States Patent
Goris et al.

[11] Patent Number: 6,157,743
[45] Date of Patent: Dec. 5, 2000

[54] METHOD FOR RETRIEVING COMPRESSED TEXTURE DATA FROM A MEMORY SYSTEM

[75] Inventors: Andrew C. Goris, Loveland; Byron A. Alcorn, Fort Collins, both of Colo.

[73] Assignee: Hewlett Packard Company, Palo Alto, Calif.

[21] Appl. No.: 09/127,287

[22] Filed: Jul. 31, 1998

[51] Int. Cl.⁷ ............................. G06K 9/36; G06F 15/16; G06F 13/16; G09G 5/00; G06T 1/00; G06T 1/60
[52] U.S. Cl. ................. 382/233; 709/247; 345/202; 345/521; 345/501; 345/507
[58] Field of Search .................. 345/202, 430, 345/515, 521, 501, 520; 382/232, 233; 709/247

[56] References Cited

U.S. PATENT DOCUMENTS

| | | | |
|---|---|---|---|
| 5,046,027 | 9/1991 | Taaffe et al. | 345/202 |
| 5,493,514 | 2/1996 | Keith et al. | 709/247 |
| 5,661,822 | 8/1997 | Knowles et al. | 382/233 |
| 5,748,904 | 5/1998 | Huang et al. | 345/202 |
| 5,818,533 | 10/1998 | Auld et al. | 348/412 |
| 5,892,522 | 4/1999 | Moutin | 345/516 |
| 5,903,282 | 5/1999 | Schoner et al. | 345/507 |
| 5,995,120 | 11/1999 | Dye | 345/501 |
| 6,002,411 | 12/1999 | Dye | 345/521 |
| 6,067,098 | 5/2000 | Dye | 345/521 |
| 6,078,690 | 6/2000 | Yamada et al. | 382/233 |

OTHER PUBLICATIONS

Andrew Beers, et al., "Rendering from Compressed Textures" (date unknown).
Andrew Beers, "Studies—Texture Compression" (printed on May 20, 1998 from the following URL: http://graphics.stanford.edu/projects/flashg/studies/texture_compression).

*Primary Examiner*—Jeffery Brier
*Assistant Examiner*—Ryan Yang
*Attorney, Agent, or Firm*—Kevin M. Hart

[57] ABSTRACT

A method for retrieving compressed texture data from a memory system while conserving bus bandwidth and memory bandwidth is disclosed. The method is particularly useful when the compressed texture data sought to be retrieved is stored in memory in the form of blocks that have varying lengths. A starting address is determined for a target compressed texture data segment stored in the memory. The target compressed segment contains a compressed data block which in turn contains a compressed representation of the texture data sought to be retrieved. A read request issuance operation is commenced, beginning with the starting address of the target segment. Various techniques are disclosed for stopping the read request issuance operation once it is determined that sufficient read requests have been issued to retrieve a complete compressed representation of the texture data of interest.

39 Claims, 11 Drawing Sheets

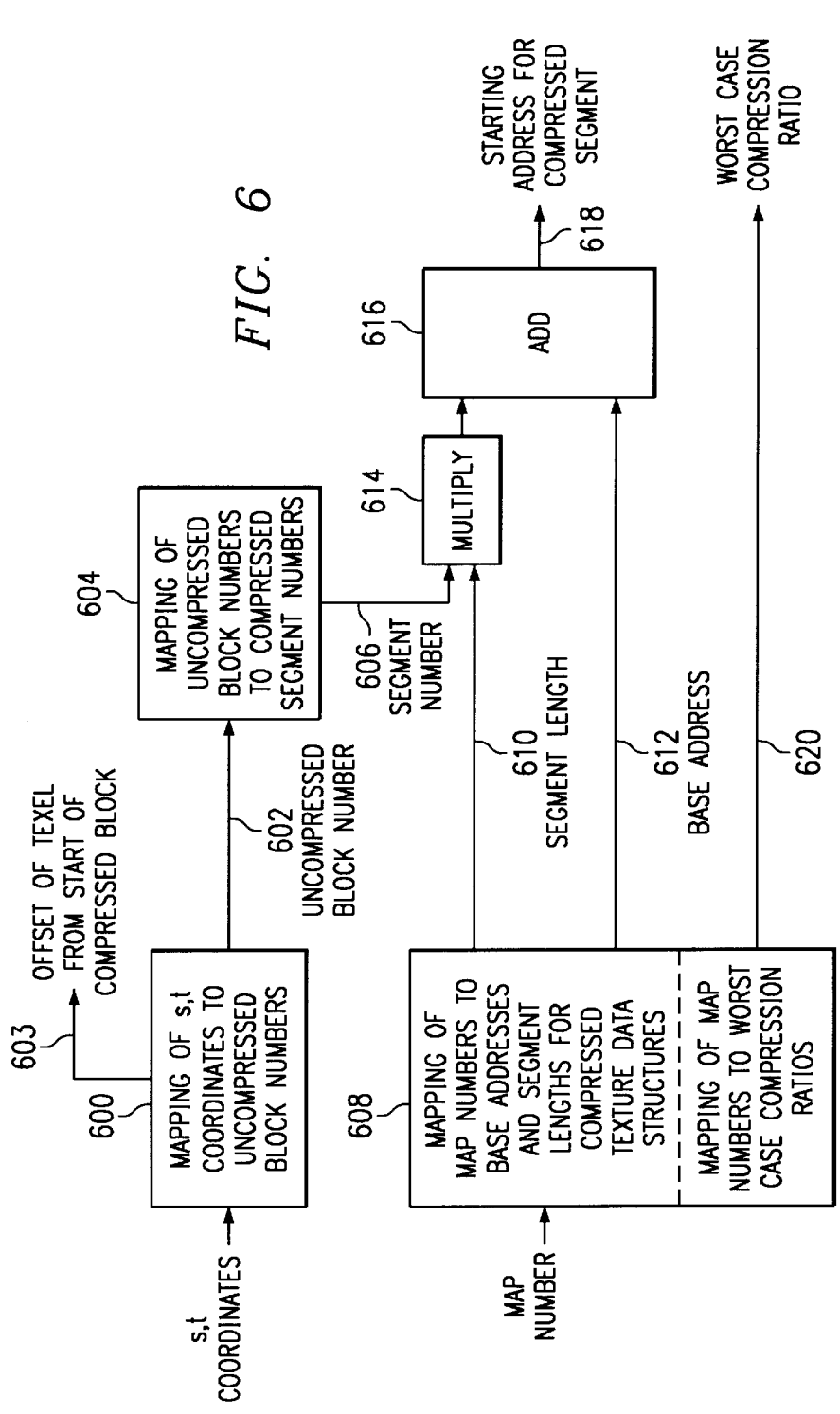

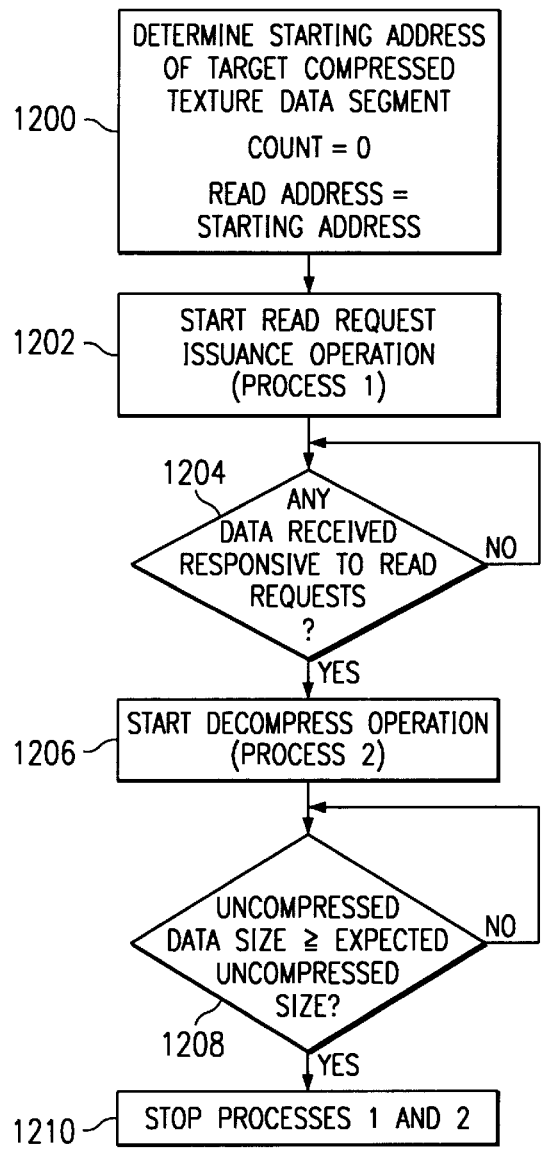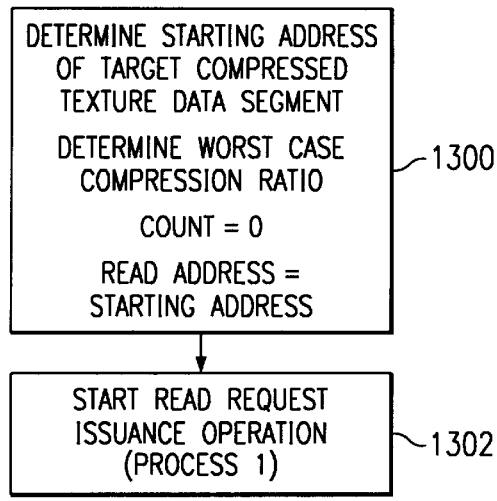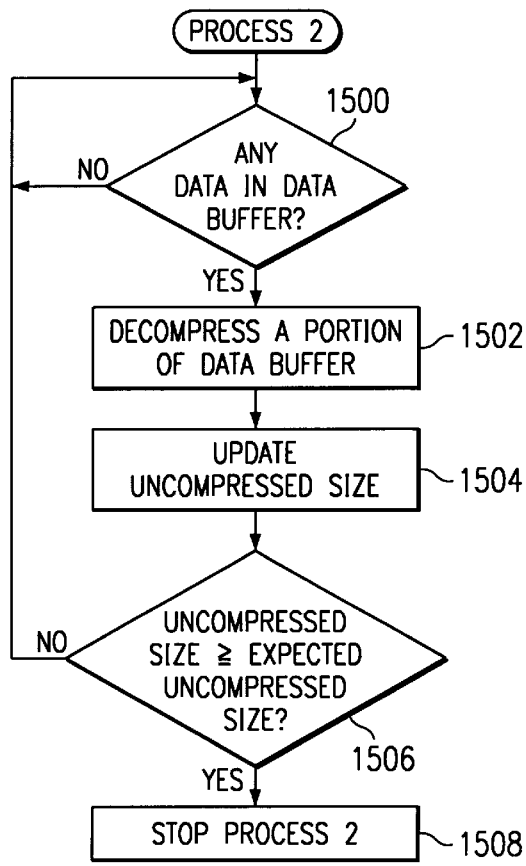

METHOD FOR RETRIEVING COMPRESSED TEXTURE DATA FROM A MEMORY SYSTEM

RELATED APPLICATIONS

This application is related to U.S. patent application Ser. No. 09/127,663, filed Jul. 31, 1998, titled "Data Structure for Efficient Retrieval of Compressed Texture Data from a Memory System."

FIELD OF THE INVENTION

This invention relates to texture mapping in computer graphics systems. More particularly, the invention relates to methods for retrieving compressed texture data from a memory system.

BACKGROUND

In the field of computer graphics, texture mapping is a known technique used to create the appearance of complexity on the surface of rendered objects without actually having to model every detail of the object's surface. Typically, the technique involves mapping a two-dimensional function or array (the texture) onto an object in three-dimensional object space and then projecting the resultant image back to two-dimensional screen space for display. The phrase "texture map" refers to the function or array that is used in the texture mapping process. A common two-dimensional texture map might consist of a repeatable pattern for representing a material, such as wood or marble for example. Three-dimensional texture maps are also used, but not as frequently. Three-dimensional texture maps are usually larger than two-dimensional texture maps. Texture maps are made up of a plurality of numerical values called texels. A texel's numerical value usually corresponds to an RGB color value and perhaps also to an alpha transparency value. (Other parameters may be included in texture maps in addition to, or in lieu of, RGB and alpha values.) A texel's location within a texture map may be designated using s,t coordinates.

A technique known as MIP mapping is also used in texture mapping. MIP mapping involves down-sampling a base texture map numerous times to develop a series of smaller texture maps, each of which represents the base map at a predetermined lower level of resolution. Typically, a map number is assigned to each map. For example, for a system in which two textures were stored, each at four different levels of resolution, eight unique map numbers would be required to refer to the texture maps individually. In systems that use MIP mapping, not only must the base map for each texture be stored in memory, but so must each of the down-sampled maps for each texture. Thus, while texture maps yield important efficiencies for rendering complex images, they can become burdensome in terms of the amount of memory that is required to store them. Indeed, the size of the texture maps used to render an image can in some cases be larger than the rendered image itself.

One technique now being used to address the storage problem associated with texture maps is to store the texture maps in the system memory of the host computer rather than in a dedicated texture memory located within the graphics subsystem. This new technique is beneficial to the extent that it eliminates or reduces the need for a large, dedicated texture memory in the graphics subsystem. On the other hand, this new technique also creates a new problem for systems that utilize hardware rendering instead of software rendering: The rendering hardware of the graphics subsystem must make frequent use of the system bus to access large amounts of texture data stored in system memory. This places significant bandwidth demands on both the system bus and system memory.

Because of these memory space and bandwidth problems associated with texture mapping, it has become popular to logically partition stored texture maps into a number of equally-sized blocks. This is done because it is usually more efficient from a bus and memory utilization point of view to retrieve an entire block of texture data from system memory than to retrieve one texel at a time.

For the same reasons, it has also become popular to store texture maps in a compressed format. Various compression algorithms have been used for this purpose including JPEG, run-length encoding, Huffman encoding, vector quantization and Lempel-Ziv compression. Each of these algorithms may be classified in a number of different ways: First, is the algorithm lossy or lossless? Lossy algorithms frequently yield better compression rates than lossless ones, but they do so at the expense of image quality. Second, does the algorithm produce a compression ratio that is fixed or variable? In other words, will the algorithm compress every portion of an image to the same degree, or will it compress highly detailed portions of the image to a lesser degree than other portions of the image? It has been observed that lossless, variable-compression-rate algorithms are the most advantageous to use for texture mapping. This is because only lossless algorithms can preserve image quality perfectly throughout the compression/decompression process. And allowing variability in the compression ratio enables the greatest possible overall compression efficiency while preserving losslessness. Another factor of importance in choosing compression algorithms is whether and how easily the compressed texture data produced by the algorithm may be accessed randomly. It is often difficult to determine in advance how a given renderer will access a texture. Therefore, the ability to randomly access compressed texture data is extremely beneficial.

Yet another technique that has become popular is a combination of the above-described methods: A texture map may be logically partitioned into blocks, and then compressed one block at a time. If the compressed texture map is stored in system memory as a set of individual compressed blocks, then a desired piece of texture data may be retrieved from system memory by retrieving only the individual compressed block that contains the desired data. Using this technique, the entire compressed texture map does not have to be retrieved from memory simply to access an individual piece of texture data within it. Moreover, because the block is retrieved in compressed format, additional bus and memory bandwidth savings are realized.

A primary problem arises, however, when attempting to implement the latter technique with data produced by variable-compression-ratio algorithms: By definition, use of a variable-compression-ratio algorithm means that the individual compressed blocks that represent the texture map will not all have the same length. Indeed, it is possible that each of the individual compressed blocks will have a different length even though the uncompressed texture map they represent was broken down into equally-sized blocks prior to compression. This complicates determining the starting address and length of a compressed block prior to accessing it. If a constant-compression-ratio algorithm is used to compress the blocks, then this problem can be avoided; the compressed blocks in such a case might simply be stored contiguously in system memory, and the offset required to address a particular block could be determined simply as a function of the block number and the known common block length. But constant-compression-ratio algorithms are usually lossy, and are undesirable for that reason.

It is therefore an object of the invention to provide an efficient technique for storing and retrieving compressed texture data from a memory.

It is a further object of the invention to provide such efficiency for contexts in which the compressed texture data to be retrieved has been produced using a variable compression-rate algorithm.

SUMMARY OF THE INVENTION

The invention includes numerous aspects, each of which contributes to more efficient utilization of bus and memory bandwidth when retrieving compressed texture data from a memory system.

In one aspect, a starting address is determined for a target compressed texture data segment stored in the memory system. The target compressed texture data segment contains a compressed representation of a target unit of texture data, such as a texel of interest. Next, a read request issuance operation is commenced. During the read request issuance operation, data read requests are directed to addresses within the target compressed texture data segment beginning with the starting address of the segment. A count of the total number of data read requests issued during the read request issuance operation is kept. Responsive to the count, a minimum uncompressed size is determined. The minimum uncompressed size corresponds to a quantity of data that will be generated by the memory system responsive to the data read requests. The read request issuance operation is stopped when the minimum uncompressed size is at least as large as an expected uncompressed size. The minimum uncompressed size may be determined using the worst case compression ratio corresponding to the data structure that contains the target segment. If it is desired to retrieve an entire block of compressed texture data, then the expected uncompressed size may be equal to a predetermined uncompressed texture block size. If, on the other hand, it is desired only to retrieve the texel of interest, then the expected uncompressed size may be determined based on an offset that indicates the location of the texel of interest relative to the beginning of an uncompressed texture block.

Alternatively, rather than determining a minimum uncompressed size, the actual size of the requested data may be compared to an expected actual size. In such a case, the expected actual size may be set equal to the size of the target segment. The read request issuance operation may be stopped as soon as the actual requested size is at least as large as the expected actual size.

In another aspect, a starting address is determined for the target compressed texture data segment stored in the memory system, and the read request issuance operation is commenced. A quantity of data is received from the memory system responsive to the read requests issued. An outstanding read count is kept. The outstanding read count corresponds to the number of data read requests that have been issued during the read request issuance operation but for which data has not yet been received from the memory system. The read request issuance operation is stopped responsive to the outstanding read count and to information contained in the quantity of data. To accomplish this, a first minimum uncompressed size may be determined responsive to the outstanding read count. The first minimum uncompressed size corresponds to the minimum uncompressed size of the data that has been requested but that has not yet been received. The worst case compression ratio for the data structure that contains the target segment may be used to calculate this first minimum uncompressed size. A second minimum uncompressed size may also be determined. The second minimum uncompressed size corresponds to the minimum uncompressed size of the data that has already been received. This second minimum uncompressed size may be determined quickly, while the data is being received, if certain types of encoding algorithms have been used to compress the texture data being received. Alternatively, in embodiments wherein decompression is performed in parallel with the read request issuance operation, this second minimum uncompressed size may correspond to a current actual uncompressed size produced by the decompression process. If the sum of the first and second minimum uncompressed sizes is at least as large as an expected uncompressed size, then the read request issuance operation may be stopped.

In another aspect, a header may be included in the target compressed texture segment. If so, the header may include a length field for indicating the size of the compressed texture data block contained within that segment. Additionally, the header may include a compression/decompression type field, the contents of which indicates which type of decompression algorithm should be used to decompress the compressed texture data block contained within that segment. If such a header is used, the read request issuance operation is commenced, and the first data bytes returned from the memory system are interpreted as header information; subsequent bytes are treated as compressed texture data. While the read request issuance operation is in progress, the header information may be parsed to determine an expected length for the compressed texture data block currently being accessed. The length of the data that has been requested may be then compared with this expected length. If the requested data length is at least as large as the expected length, the read request issuance operation may be stopped. In embodiments that use the compression/decompression type field, the retrieved data may be decompressed according to whichever algorithm was suggested in the compression/decompression type field of the header.

In all of the above aspects, the starting address of the target compressed texture data segment may be determined using the s,t coordinates and map number for the target texel. A determination may be made, based on the s,t coordinates of the texel, as to which uncompressed block of an uncompressed texture map would contain the texel. Then, a target segment number may be determined responsive to the selected uncompressed block number. The target segment number may be multiplied by the segment length corresponding to the data structure that contains the target segment. The result of this multiplication may simply be added to the base address of the data structure to determine the starting address of the target segment.

In yet another aspect, s and t coordinates and a map number corresponding to a target texel may be applied to a mapping function located within a graphics subsystem of a host computer. From the output of the mapping function, a starting address and block length may be determined. The starting address and block length correspond to a compressed texture data block stored in the system memory of the host computer system. The starting address and block length so determined are used to retrieve the compressed texture data block from the system memory into the graphics subsystem using the system bus of the host computer. This latter aspect of the invention yields system bus bandwidth efficiency because the system bus need not be used to determine the starting address and block length of the target compressed texture data block prior to accessing it.

BRIEF DESCRIPTION OF THE DRAWING

FIG. 6 is a block diagram illustrating a method for determining the starting addresses of the compressed texture data segments of FIGS. 5 and 6.

FIG. 9 is a block diagram illustrating a prior art type of encoding that may be used to compress texture data.

FIG. 12 is a flow diagram illustrating a fourth method of retrieving compressed texture data from a memory system according to a preferred embodiment of the invention.

FIGS. 13, 14 and 15 are flow diagrams illustrating a fifth method of retrieving compressed texture data from a memory system according to a preferred embodiment of the invention.

DETAILED DESCRIPTION OF THE PREFERRED EMBODIMENTS

1 A Representative Host Computer System

Figure 1:
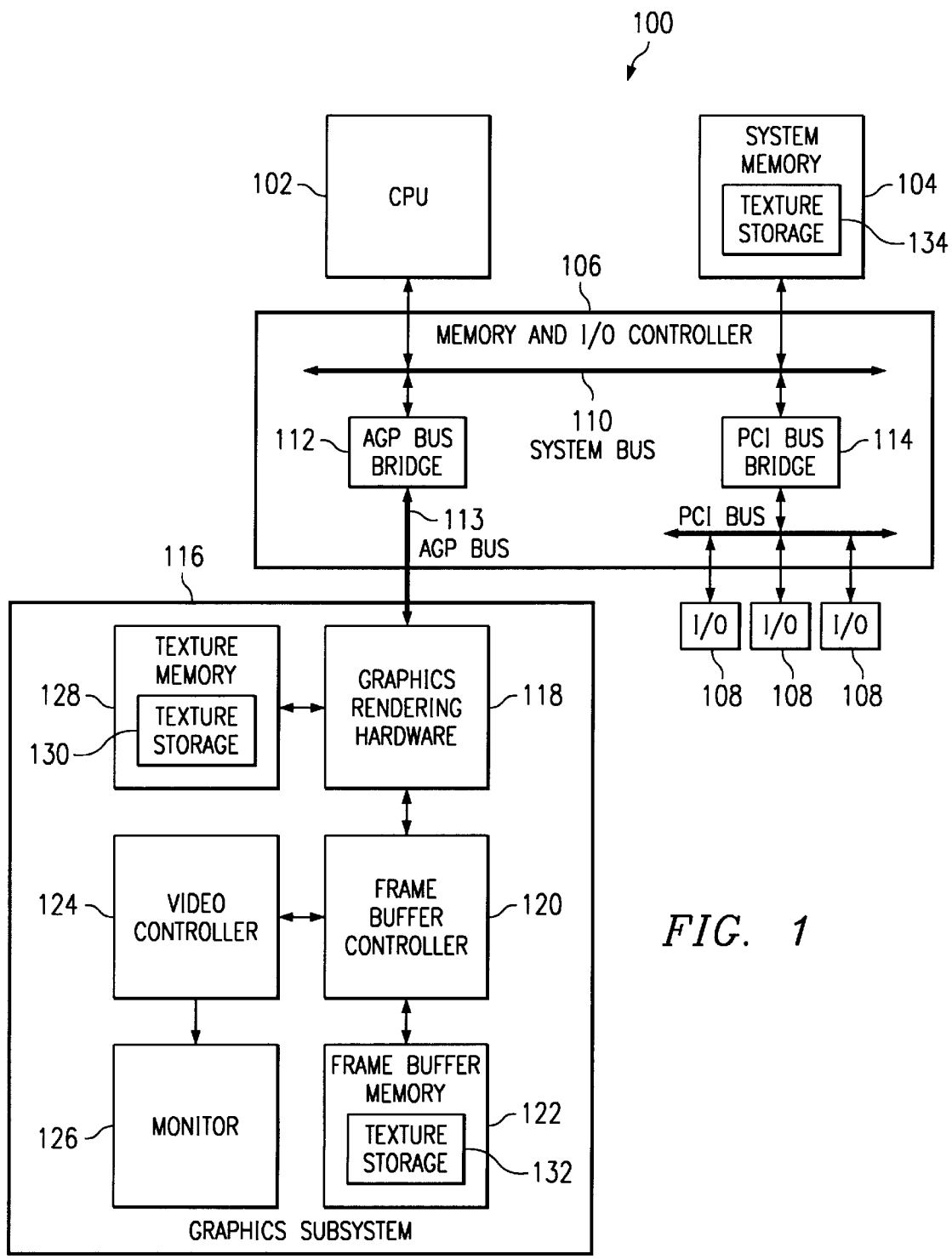
FIG. 1 is a schematic diagram illustrating a computer system suitable for implementing an embodiment of the invention.

FIG. 1 illustrates a computer system 100 suitable for implementing a preferred embodiment of the invention. Computer system 100 includes at least one CPU 102, system memory 104, memory and I/O controller 106, and several I/O devices 108 such as a printer, scanner, network interface or the like. (A keyboard and mouse would also usually be present as I/O devices, but may have their own types of interfaces to computer system 100.) Typically, memory and I/O controller 106 will include a system bus 110 and at least one bus interface such as AGP bus bridge 112 and PCI bus bridge 114. PCI bus bridge 114 may be used to interface I/O devices 108 to system bus 110, while AGP bus bridge 112 may be used, for example, to interface graphics subsystem 116 to system bus 110. The specific types of buses shown in the drawing, as well as the architecture of computer system 100, are provided by way of example only. Other bus types and architectures may be used to implement the invention.

Graphics subsystem 116 will typically include graphics rendering hardware 118, frame buffer controller 120 and frame buffer memory 122. Frame buffer controller 120 is interfaced with a video controller 124 (e.g., RAMDACs and sync and blank generation circuitry) for driving display monitor 126. Graphics rendering hardware 118 will typically include 2D (and perhaps 3D) geometry acceleration hardware interfaced with AGP bus 113, and rasterizer/texture mapping hardware interfaced with texture memory 128 and frame buffer controller 120.

Texture data may be stored in numerous different locations within computer system 100. For example, a dedicated texture memory 128 is provided within graphics subsystem 116. (Texture memory 128 which may be implemented as a small on-chip cache or a larger off-chip texture memory, or a combination of the two.) Texture data may be stored in texture storage 130 within texture memory 128, where it is immediately available to the rasterizer/texture mapping hardware in graphics rendering hardware 118. Or texture data may be stored in texture storage 132 within frame buffer memory 132. Texture data may also be stored in texture storage 134 within system memory 104. While only a relatively small amount of memory is typically available in texture storage 130, the delays incurred when the rasterizer/texture mapping hardware accesses texture data stored there are also very small. Slightly larger memory size may be available in texture storage 132, but slightly longer delays will be incurred when accessing texture data stored there. This is because of the bandwidth limitations associated with accessing frame buffer memory 122 via frame buffer controller 120. A relatively large amount of memory is typically available in texture storage 134, but very significant delays will be incurred when accessing texture data stored there. This is because memory and I/O controller 106, system bus 110 and system memory 104 must be shared by virtually all of the components of computer system 100. Consequently, for texture mapping, the solution of choice is to use texture storage 132 as a cache of texture storage 134, and to use texture storage 130 as a cache of texture storage 132.

2 Contiguous Storage of Variable-Length Compressed Blocks

Figure 2:
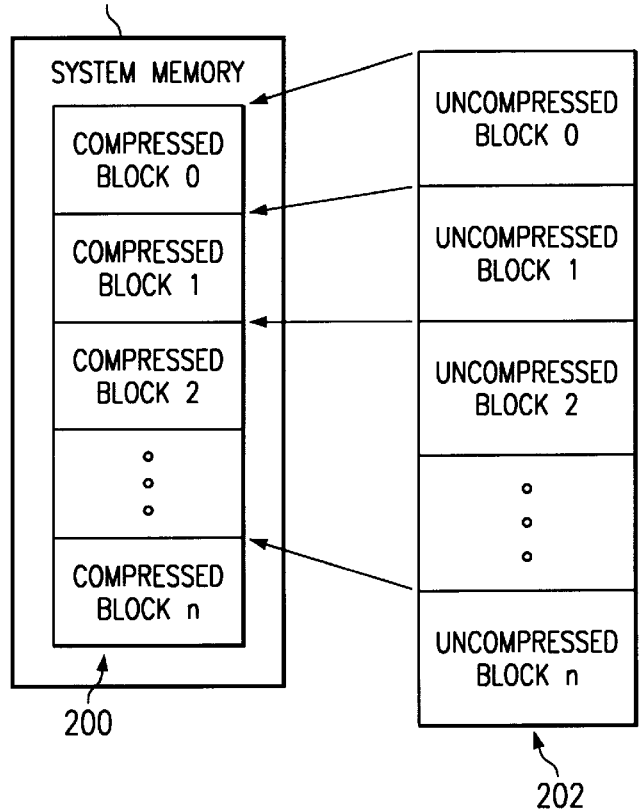
FIG. 2 is a block diagram illustrating a first technique for storing variable-length blocks of compressed texture data in a memory system.

FIG. 2 illustrates a first technique for storing variable-length blocks of compressed texture data in a memory system. Data structure 200 includes a number of compressed texture data blocks 0–n. Compressed blocks 0–n do not have a common block length. Nevertheless, they are stored contiguously in system memory 104. Uncompressed texture map 202 is shown in the drawing simply to illustrate the correspondence between uncompressed blocks 0–n and compressed blocks 0–n in data structure 200. (Usually, once texture map 202 has been compressed, only the compressed version would be stored in memory.) Each of uncompressed blocks 0–n has the same block length. While data structure 200 has the advantage that it conserves memory space in system memory 104, it cannot be used without some additional scheme for determining the starting addresses for each of compressed blocks 0–n.

Figure 3:
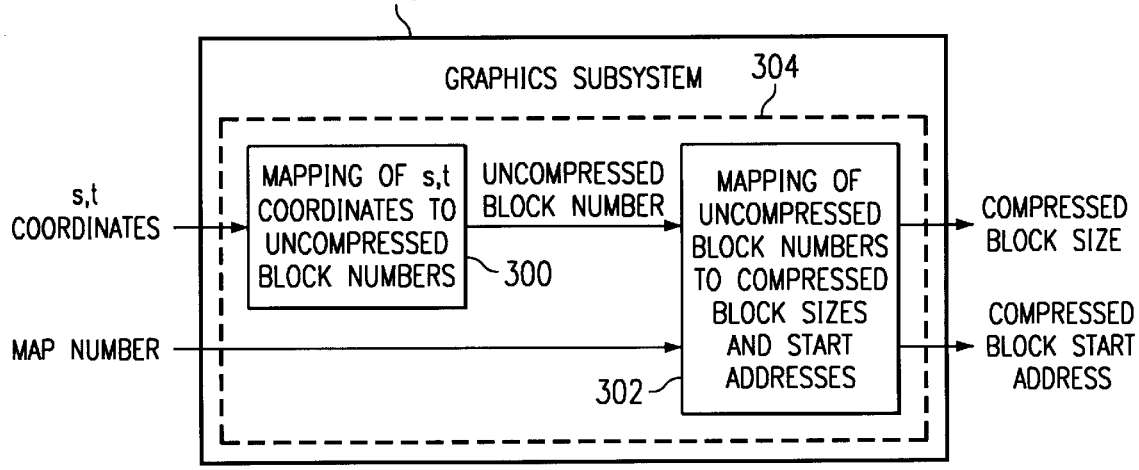
FIG. 3 is a block diagram illustrating a method for determining the starting addresses and block sizes for the compressed texture data blocks of FIG. 2.

FIG. 3 illustrates such a scheme. The s,t coordinates of a texel may be used with a mapping function 300 to determine which uncompressed block of an uncompressed texture map would contain the texel. A mapping function such as mapping function 300 may be implemented, for example, with a lookup table or with combinational logic. Then, the uncompressed block number and the map number for the texel may be used with a mapping function 302 to determine (1) the starting address in system memory for the actual compressed block that contains a compressed representation of the texel, and (2) the length of that compressed block. Preferably, a lookup table would be used to implement a mapping function such as mapping function 302. In other embodiments, mapping functions 300 and 302 may be subsumed entirely into one large lookup table 304. Regardless of how the mapping functions are implemented, it is preferable that they be located physically within graphics subsystem 116 rather than in system memory 104. If they were located within system memory 104, then system bus 110 would have to be used at least twice when accessing a block of compressed texture data stored in system memory 104—once to determine the starting address and block length for the compressed block, and again to access the block itself. Such a technique would be inefficient from the point of view of system bus and system memory bandwidth.

3 Storage of Variable-Length Compressed Blocks in Equally-Sized Segments

Figure 4:
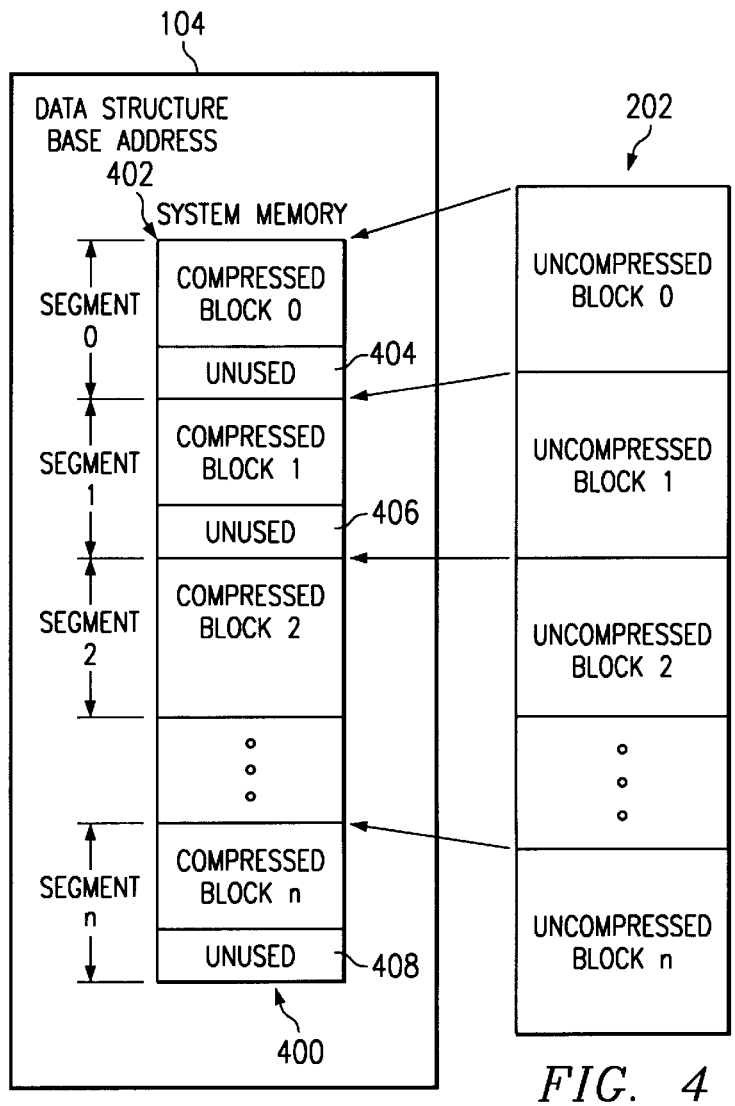
FIG. 4 is a block diagram illustrating a second technique for storing variable-length blocks of compressed texture data in a memory system

FIG. 4 illustrates a technique for storing variable length compressed texture data blocks in equally-sized segments. Data structure 400 is stored in system memory 104 beginning at base address 402. Data structure 400 consists of segments 0–n, each having a common segment size. Within each segment 0–n is a compressed block 0–n, respectively. Because the size of each segment is the same but the size of each compressed block is potentially different, almost all of segments 0–n will include a portion of unused memory, as shown for example at 404, 406 and 408. Thus, data structure 400 wastes some memory relative to data structure 200. Note, however, that storage of the variable-length blocks in equally-sized segments simplifies the calculation of the starting address for each block (or segment), as will be explained in more detail below.

Preferably, when data structure 400 is created, texture map 202 will first have been fully compressed, block by block. Then, the segment size for data structure 400 may be set equal to the largest of compressed blocks 0–n (i.e., the block having the worst case compression ratio). In this manner, the amount of system memory wasted by unused portions such as portions 404, 406 and 408 will be minimized. It may also be beneficial to round the segment size up to the nearest power of two, so that calculation of segment starting addresses may be further simplified. (If the segment size is a power of two, then multiplications necessary during address calculations may be preformed using simple shift operations.) Alternatively, the segment size may be rounded up to another convenient figure such as a cache line boundary.

Figure 5:
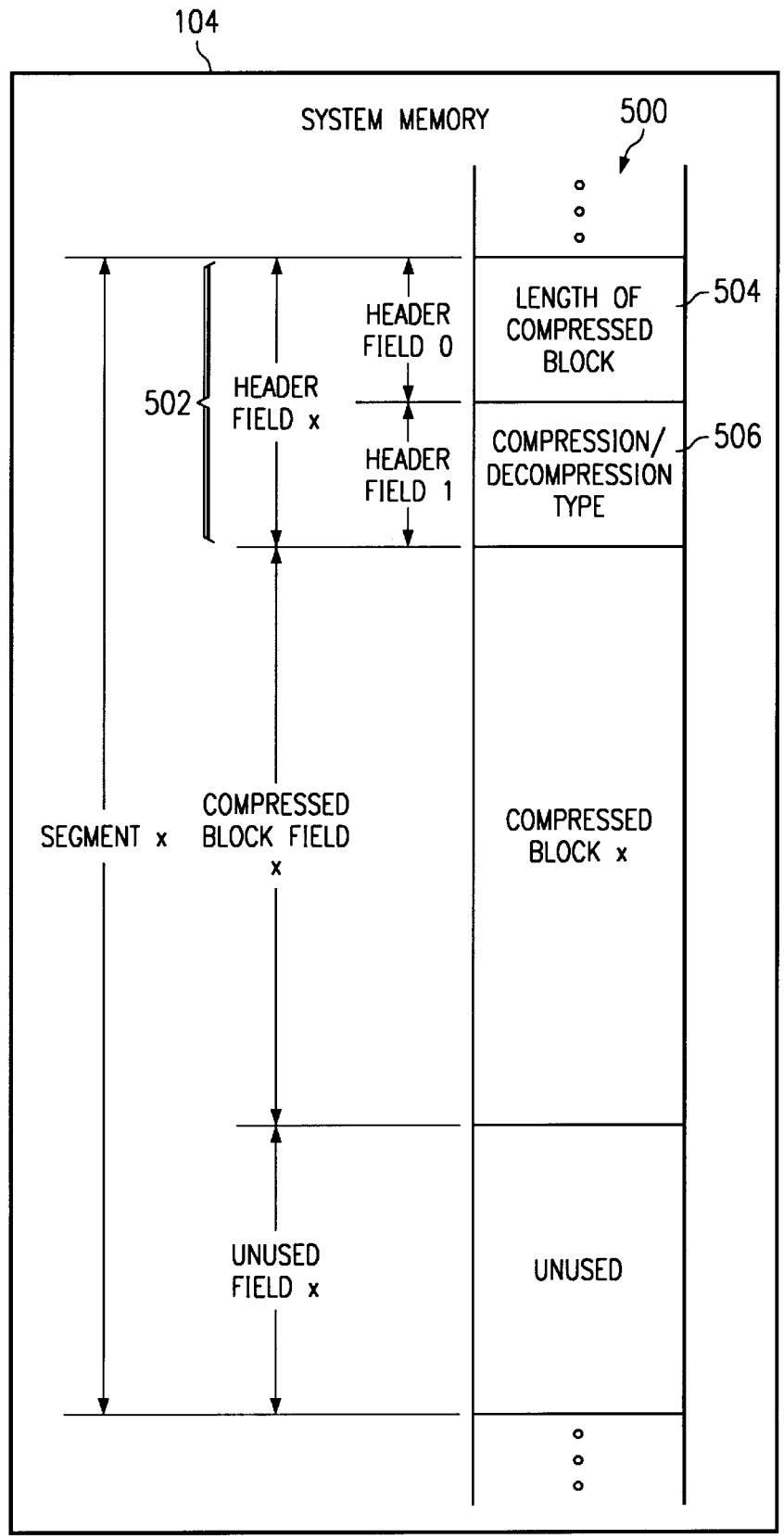
FIG. 5 is a block diagram illustrating a third technique for storing variable-length blocks of compressed texture data in a memory system.

FIG. 5 illustrates a variation on the theme of FIG. 4. A representative portion (one segment) of a data structure 500 is shown stored in system memory 104. Data structure 500 is the same in all respects to data structure 400, except that a header 502 has been added to the beginning of each segment. Preferably, header 502 will contain a block length field 504, the purpose of which is to indicate the length of the compressed block contained in that segment (in the example of the drawing, compressed block x). Optionally, another field 506 may be contained in header 502. Compression/decompression type field 506 may be used to indicate the type of compression algorithm that was used to produce the compressed block contained in that segment. (Equivalently, field 506 may indicate the type of decompression algorithm that should be used to decompress the block.) The benefit of using a compression/decompression type field 506 is that a different algorithm may be used to create each of the compressed blocks in data structure 500. In this manner, the overall size of data structure 500 may be minimized.

4 Determining Compressed Texture Data Segment Starting Addresses

Given the s,t coordinates and map number for a texel of interest, FIG. 6 illustrates a method for determining the starting address of the compressed texture data segment (such as those illustrated in FIGS. 4 and 5) that contains a compressed representation of the texel. For purposes of this discussion, the compressed texture data segment that contains a compressed representation of the texel of interest will be called the target compressed texture data segment. The s,t coordinates of the texel are used with a mapping function 600 to determine which uncompressed block of an uncompressed texture map would contain the texel. (This mapping function is analogous to mapping function 300 described above.) Mapping function 600 produces, then, an uncompressed block number 602 corresponding to the texel of interest. (Also, mapping function 603 will produce an offset 603 that indicates the position of the texel relative to the beginning of the uncompressed block.) In the general case, uncompressed block number 602 may be used with a mapping function 604 to determine a segment number 606. Segment number 606 identifies which compressed texture data segment in a data structure such as data structure 400 or 500 is the target segment. In a preferred embodiment, the uncompressed block numbers are numbered from 0 to n, as are the segment numbers; and mapping function 604 is simply the identity function. (In other words, in a preferred embodiment, segment number 606 is simply equal to uncompressed block number 602.)

The map number corresponding to the texel of interest is used with a mapping function 608 to determine a segment length 610 corresponding to the data structure that contains the target segment. (In a preferred embodiment, the compressed texture segment lengths may be the same for all compressed texture maps stored in computer system 100. If so, then this aspect of mapping function 608 may be omitted. Indeed, it is a feature of data structures 400 and 500 that they enable this mapping function to be omitted if desired. But, in the general case, each map number may correspond to a different segment length.) Also, mapping function 608 produces the base address 612 for the data structure that contains the target segment. Segment number 606 is multiplied with segment length 610 at block 614, and the result is added to base address 612 at block 616 to produce the starting address 618 for the target compressed texture data segment. (As was alluded to above, if the segment length is a power of two, then multiply function 614 may be implemented with a shift register.)

Worst case compression ratio 620 corresponds to the data structure that contains the target segment. It may be produced by mapping function 608. In alternative embodiments, it may be determined as a function of the segment length and the size of the uncompressed texture data blocks. (The size of the uncompressed texture data blocks is assumed to be known in advance. Preferably, it will be the same for each texture map and will be independent of the compression algorithms used to compress them.)

5 Useful Buffers and Datapaths

Figure 7:
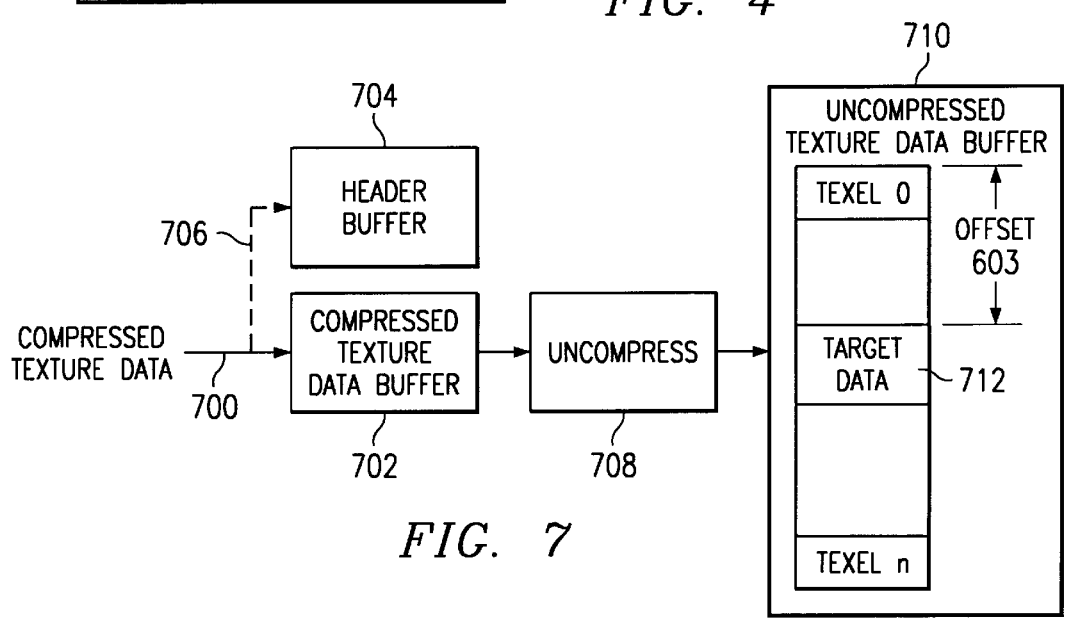
FIG. 7 is a block diagram illustrating buffers and data paths that may be used when retrieving compressed texture data from the data structures of FIGS. 5 and 6.

Before discussing the preferred data retrieval methods in detail, it will be beneficial to discuss the buffers and datapaths illustrated in FIG. 7. When compressed texture data is read by graphics subsystem 116 from system memory 104, compressed texture data will arrive over on path 700. It may then be stored in compressed texture data buffer 702. When headers are utilized, such as with data structure 500, a header buffer 704 may be provided, accessible on path 706. Preferably, an uncompress process 708 (such as a state machine) has access to compressed texture data buffer 702, and fills uncompressed texture data buffer 710, as shown. Target data 712 may be retrieved from uncompressed texture data buffer 710 using offset 603.

Figure 8A:
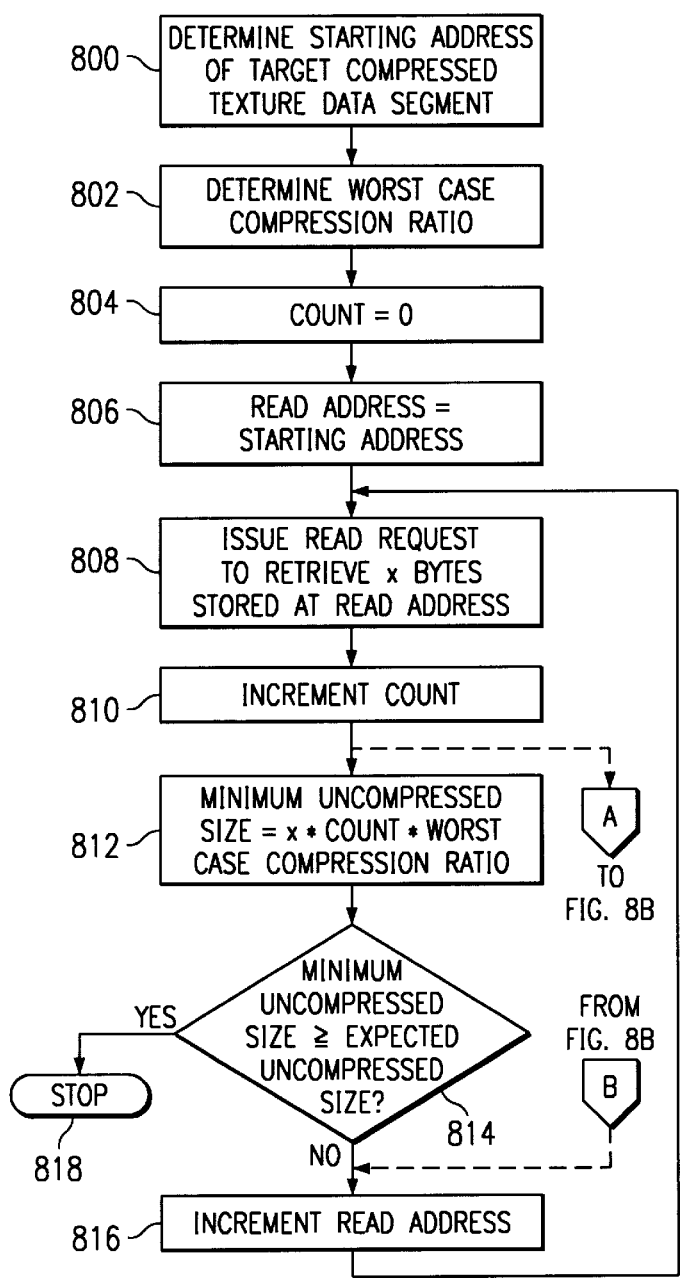
FIG. 8A is a flow diagram illustrating a first method for retrieving compressed texture data from a memory system according to a preferred embodiment of the invention.

6 Efficient Retrieval of Compressed Texture Data Without Knowing the Compressed Block Length in Advance FIG. 8A illustrates an efficient method of retrieving compressed texture data from a memory system wherein the length of the compressed block being accessed is not known in advance. In step 800, the s,t coordinates and map number for a target texel are used to determine the starting address in system memory 104 of a target compressed texture data segment. In step 802, the worst case compression ratio (hereinafter "WCCR") is determined for the data structure containing the target compressed segment. The methods discussed above in the context of FIG. 6 may be used for these purposes. (For purposes of this discussion and the claims that follow it, a compression ratio is defined as the ratio of an object's size before compression to its size after compression. For example, if a compression algorithm were able to compress a 40k byte object into a 10k byte object, then the compression algorithm can be said to have achieved a 4:1 compression ratio on the object.) In step 804, a count is initialized to 0. This count will be used to keep track of the total number of read requests issued to system memory 104. In step 806 a read address is initialized to the starting address for the target segment determined in step 800.

In step 808, a read request issuance operation begins, during which data read requests will be directed sequentially to addresses within the target compressed segment, beginning with the starting address determined in step 800. A read request is issued in step 808 directed to the address stored in read address. (Each read request will preferably retrieve more than one byte of data. For purposes of this discussion, assume each read request will retrieve x bytes of data.) In step 810, the count is incremented. In steps 812 and 814, a test is performed to determine whether the read request issuance operation may be stopped. In step 812, a minimum uncompressed size is determined that corresponds to the minimum uncompressed size of the data that has been requested thus far. To determine this size, the count is multiplied by the number of bytes each read request will retrieve ("x" in this example). The result of the multiplication is multiplied by WCCR. In step 814, the minimum uncompressed size so determined is compared with an expected uncompressed size. The expected uncompressed size used in this comparison may be the uncompressed size of the block (known in advance), or it may be based on offset value 603 (for example, the expected uncompressed size may be set to offset+1 if only the target texel is sought to be retrieved). If the minimum uncompressed size is less than the expected uncompressed size, then the read address is incremented appropriately in step 816 and another read request is issued at step 808. But if the minimum uncompressed size is at least as large as the expected uncompressed size, then the read request issuance operation may be stopped, as indicated at 818.

Figure 8B:
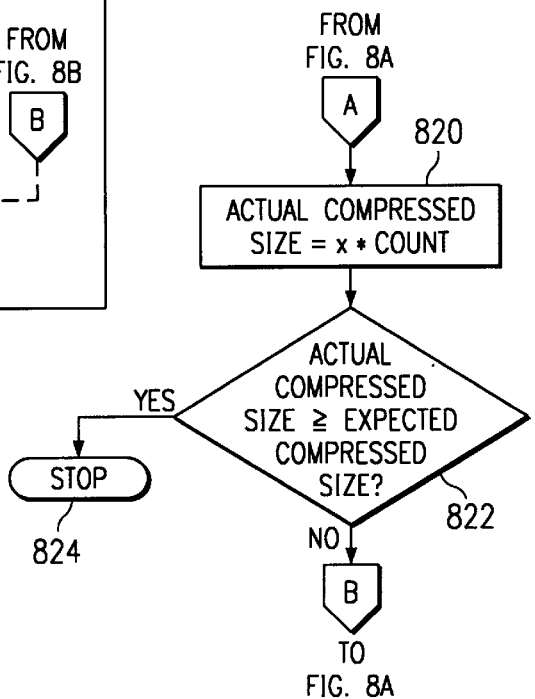
FIG. 8B is a flow diagram illustrating a modification to the method of FIG. 8A.

FIG. 8B illustrates a modification to the method of FIG. 8A. In FIG. 8B, step 820 replaces step 812, and step 822 replaces step 814. In step 820, an actual compressed size is calculated for the data that has been requested. The actual compressed size is simply x*count. In step 822, this actual compressed size is compared with an expected compressed size. The expected compressed size may simply be the segment size. If the actual compressed size is at least as large as the expected compressed size, then the read request issuance operation may be stopped in step 824. But if the actual compressed size is less than the expected compressed size, then operation continues at step 816. Note that, for the special case involving data structures in which the segment size is set equal to the size of the largest block, the method of FIG. 8B will yield the same result as the method of FIG. 8A if the expected uncompressed size in FIG. 8A is set to the size of an uncompressed block. (This result being that an entire compressed texture data segment will be read even if the compressed texture data block within it is not as large as the segment.)

7 Method Enhancement for Use When the Uncompressed Size of the Received Data Can Be Determined Quickly FIG. 9 is intended to illustrate a general class of encoding algorithms in which the size of the uncompressed data can be determined incrementally and quickly as it is being received. An examples of such encoding algorithms is run-length coding. The data stream resulting from encoding techniques like run-length encoding is characterized in that a repeat number 900 is sent, followed perhaps by a size field 902 corresponding to the size of the data to be repeated, followed by the actual data 904 that is to be repeated (or an indicator that can be used to look up the data). Note that, in run-length encoding, the size field 902 is optional; thus, the size may simply be implied. By simply multiplying the repeat number by the size of the data to be repeated, an uncompressed size may be determined and accumulated as more encoded data is received.

Figure 10:
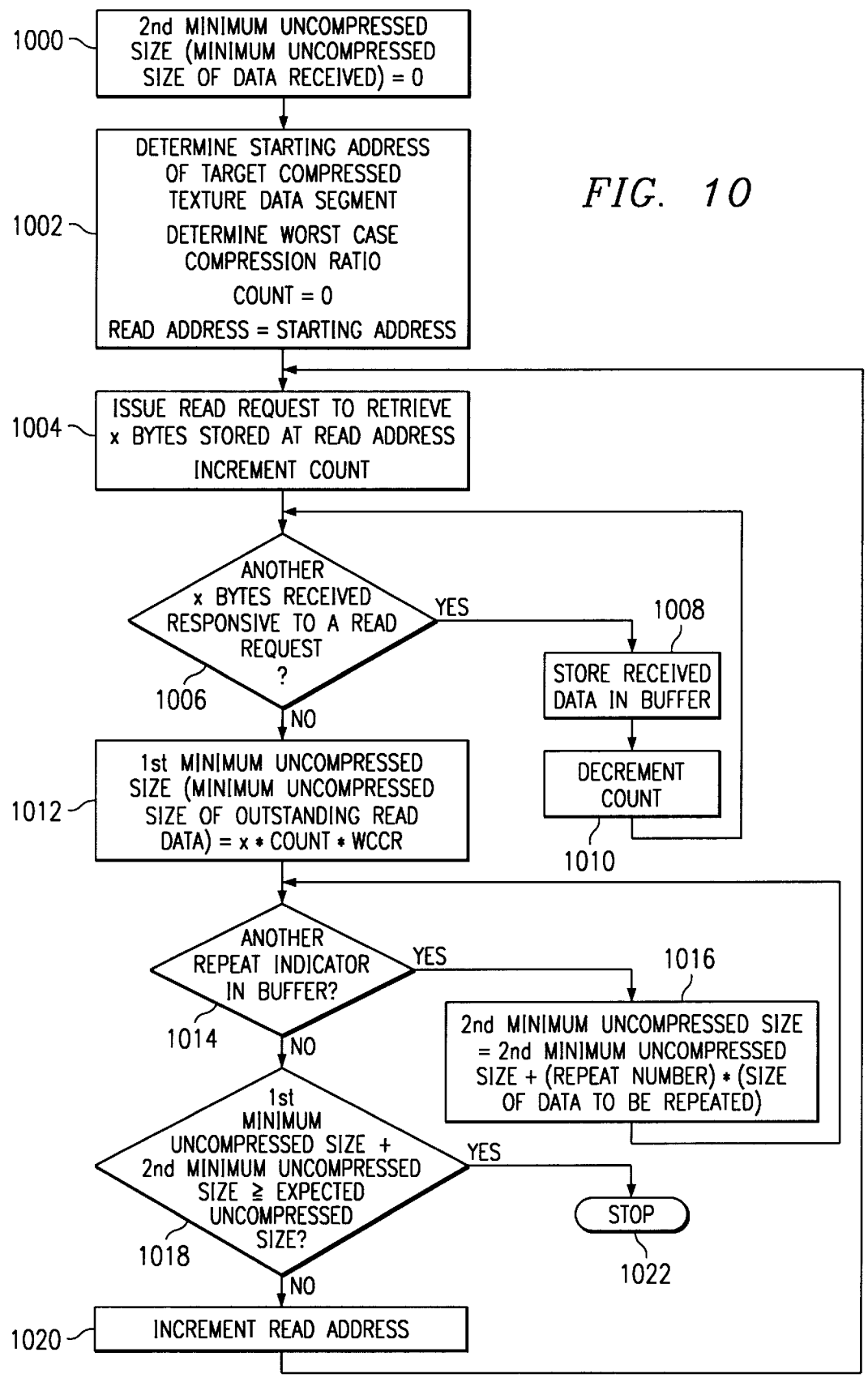
FIG. 10 is a flow diagram illustrating a second method of retrieving compressed texture data from a memory system according to a preferred embodiment of the invention.

The method of FIG. 10 takes advantages of circumstances like those just described, in which the size of the uncompressed data can be determined incrementally and quickly as it is being received. In step 1000, a second minimum uncompressed size value is initialized to 0. This value will be used to accumulate the uncompressed size of the received data, as discussed above. In step 1002, other values are initialized: The starting address of the target compressed texture data segment is determined, along with the WCCR associated with that segment's data structure. A count value is initialized to zero. This count value will be used to keep track of outstanding read requests (i.e., read requests that have been issued but for which data has not yet been received). Finally, the read address value is initialized to the starting address of the target segment. In step 1004, the read request issuance operation is begun: A read request is issued for x bytes of data stored at the read address, and the count is incremented. Steps 1006, 1008 and 1010 represent the process of receiving quantities of data responsive to the read requests, storing the received data in a compressed texture data buffer such as buffer 702, and decrementing the count once for every x bytes of data received (so that count always reflects the number of read requests that have been issued but for which no data has been received).

In step 1012, a first uncompressed size is determined. This size corresponds to the size of the data that has been requested but that has not yet been received. This value may be determined by multiplying x by the count, and multiplying by WCCR.

Steps 1014 and 1016 represent the process of accumulating the second uncompressed size discussed above. As long as unprocessed repeat indicators exist in buffer 702, the second minimum uncompressed size may be updated by multiplying the repeat number by the size of the data to be repeated, and adding it to the accumulated total.

In step 1018, the first and second minimum uncompressed sizes are added together. If their sum is at least as large as an expected uncompressed size (for example, the size of an uncompressed block, or a size determined from offset 603), then the read request issuance operation may be stopped, as indicated at 1022. But if their sum is less than the expected uncompressed size, the read address is incremented appropriately in step 1020 and operation resumes at step 1004.

Note that the order of steps shown in all of the flow diagrams herein are illustrative only. The steps may be performed in different orders, or even simultaneously by different processes or by different state machines, without departing from the spirit and scope of the invention.

8 Use of Headers Within the Compressed Texture Data Segments

Figure 11:
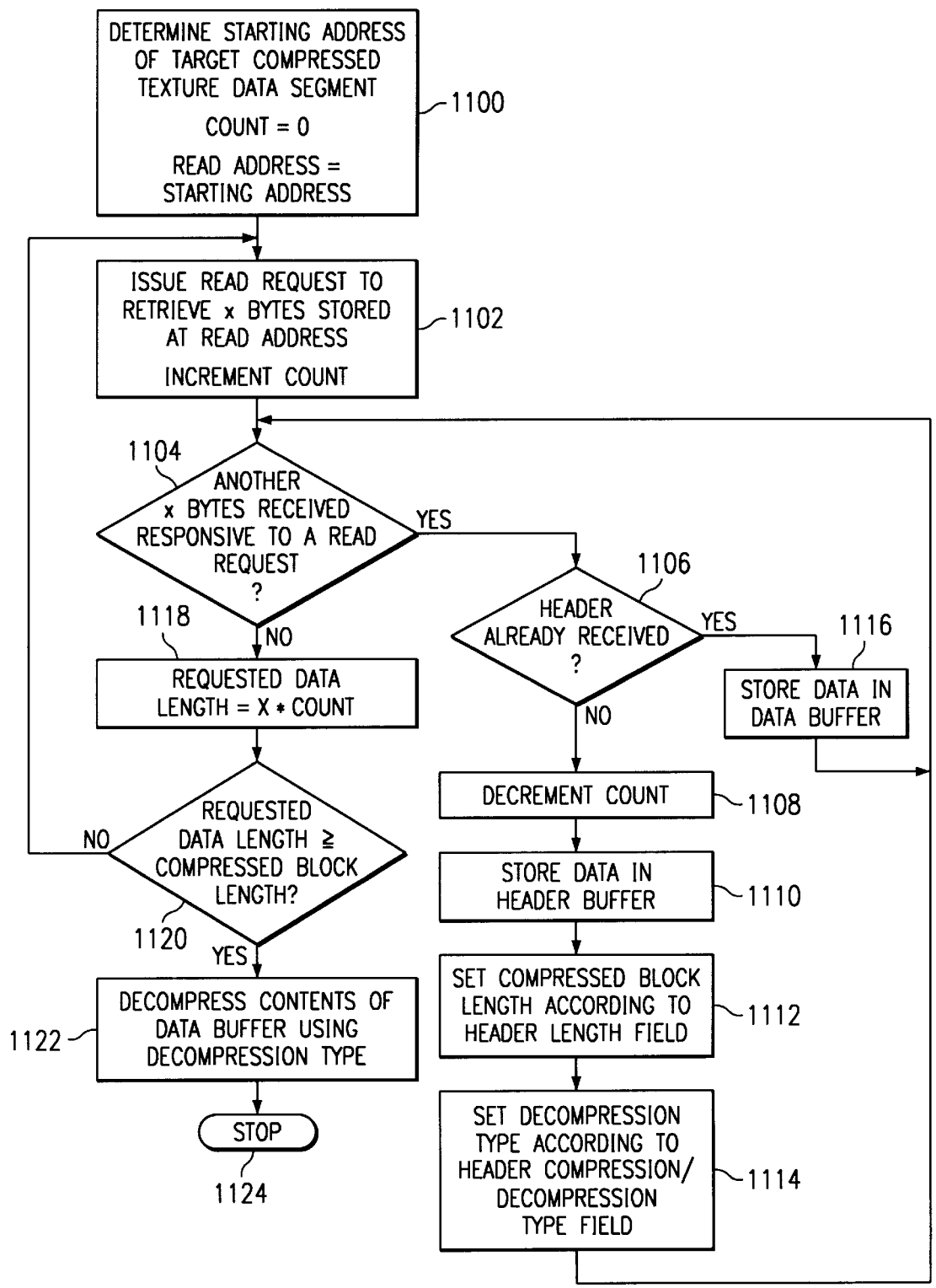
FIG. 11 is a flow diagram illustrating a third method of retrieving compressed texture data from a memory system according to a preferred embodiment of the invention.

FIG. 11 illustrates a method that may be used to retrieve compressed texture data from a memory system wherein a data structure such as data structure 500 is used.

Initialization activities are performed in step 1100: The starting address of the target compressed segment is determined; a count is set to 0; and the read address value is set equal to the starting address of the target segment. In step 1102, the read request issuance operation begins: A read request is issued to retrieve x bytes of data stored at the read address; and the count is incremented. Note that the count in the method of FIG. 11 will keep track of the total number of read requests issued, rather than the number of outstanding read requests.

Steps 1104–1116 represent the process of receiving and storing data. If any bytes have been received (step 1104), a check is made in step 1106 to determine whether or not a header has yet been received. If not, the count is decremented in step 1108 (the header does not count as data). And the header is stored in buffer 704 (step 1110). Then, an expected compressed block length value is set according to compressed block length header field 504. In embodiments that use a compression/decompression type header field 506, a decompression type value is set in step 1114 using the information in header field 506. This decompression type value may be used later to decompress the received data. If it is determined in step 1106 that the header has already been received, then the incoming data is simply stored in buffer 702 (step 1116).

In step 1118, a requested data length value is calculated by multiplying x*count. In step 1120, this value is compared with the expected compressed block length value that was set in step 1112. If the requested data length is at least as large as the expected compressed block length, then the read request issuance operation may be stopped, as indicated in step 1124, and the received data uncompressed. Optionally, in implementations using compression/decompression type header fields 506, the decompression may be performed in step 1122 using whichever algorithm was indicated by the decompression type value set in step 1114.

9 Parallel Decompression

It is possible to decompress the contents of buffer 702 while the read request issuance operation is still in progress, either by using separate processes or separate state machines to perform the respective jobs. In such implementations, methods such as those illustrated in FIGS. 12–15 may be employed. The method illustrated in FIG. 12 is more basic than the one illustrated in FIGS. 13–15; therefore, it will be discussed first.

In step 1200, initialization occurs: The starting address of the target compressed segment is determined; a count is set to 0; and the read address value is set equal to the starting address of the target segment. In step 1202, a read request issuance operation is begun as process 1. If it is determined in step 1204 that any data has been received responsive to the read request issuance operation, then decompress operation 708 is begun in step 1206 as process 2. Process 2 maintains a current uncompressed data size to show its progress. While processes 1 and 2 are in progress, step 1208 is performed to compare the current uncompressed data size to the expected uncompressed data size. If the current uncompressed size is at least as large as the expected uncompressed size, then both processes 1 and 2 may be stopped in step 1210.

Figure 14:
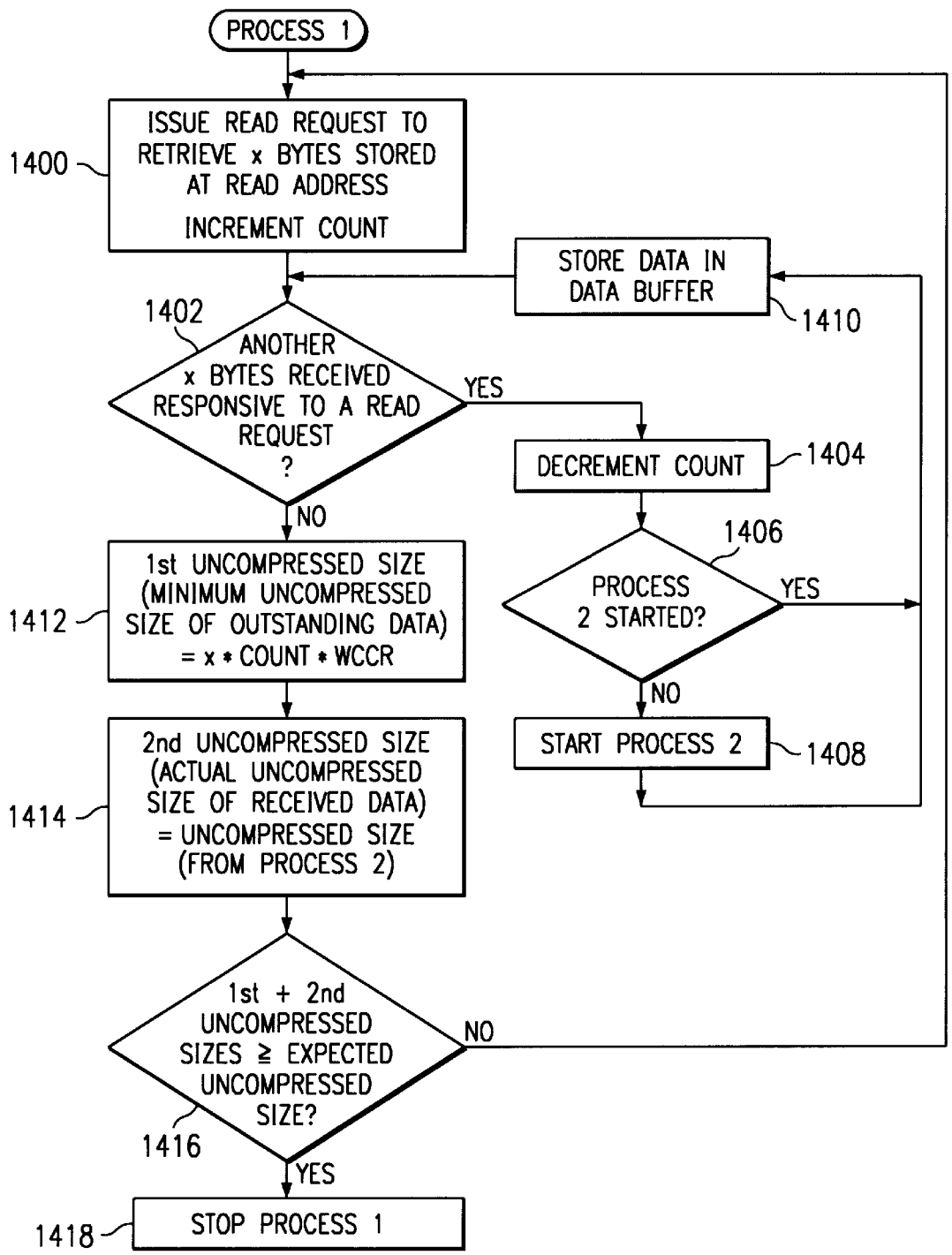

The method illustrated in FIGS. 13–15 is slightly more involved than the method of FIG. 12, but probably also more efficient. In step 1300, initialization occurs just as in step 1200 except that the WCCR is also determined. The read request issuance operation is begun in step 1302 as process 1. Process 1 is illustrated in FIG. 14.

In step 1400, a read request is issued to retrieve x bytes stored at the read address, and the count is incremented. If it is determined in step 1402 that x bytes of data have been received, the count is decremented in step 1404. (In this case, the count will keep track of the outstanding read requests, not the total number of read requests issued.) If it is determined in step 1406 that the decompression process has not yet been started, then it is started as process 2. This process 2 will be discussed below with reference to FIG. 15. In step 1410, the received data is stored in buffer 702.

In step 1412, a first uncompressed size is determined. This first size corresponds to the minimum uncompressed size of the data that has been requested but that has not yet been received. It is determined by multiplying x*count, and multiplying by WCCR. In step 1414, a second uncompressed size is determined. This second size corresponds to the actual uncompressed size value that is maintained by process 2 as a progress indicator. In step 1416, the first and second sizes are added together. If their sum is at least as large as an expected uncompressed size, then the read request issuance operation (process 1), may be stopped in step 1418. Otherwise, process 1 continues at step 1400.

The decompression activities of process 2 are illustrated in FIG. 15. If any unprocessed data exists in buffer 702 (step 1500), at least a portion of it may be decompressed (step 1502). In step 1504, the uncompressed size progress indicator should be updated. In step 1506, the updated uncompressed size value is compared to the expected uncompressed size. If the actual uncompressed size is at least as large as the expected uncompressed size, then the decompression process may be stopped in step 1508. But if not, decompression may continue at step 1500.

Figure 16:
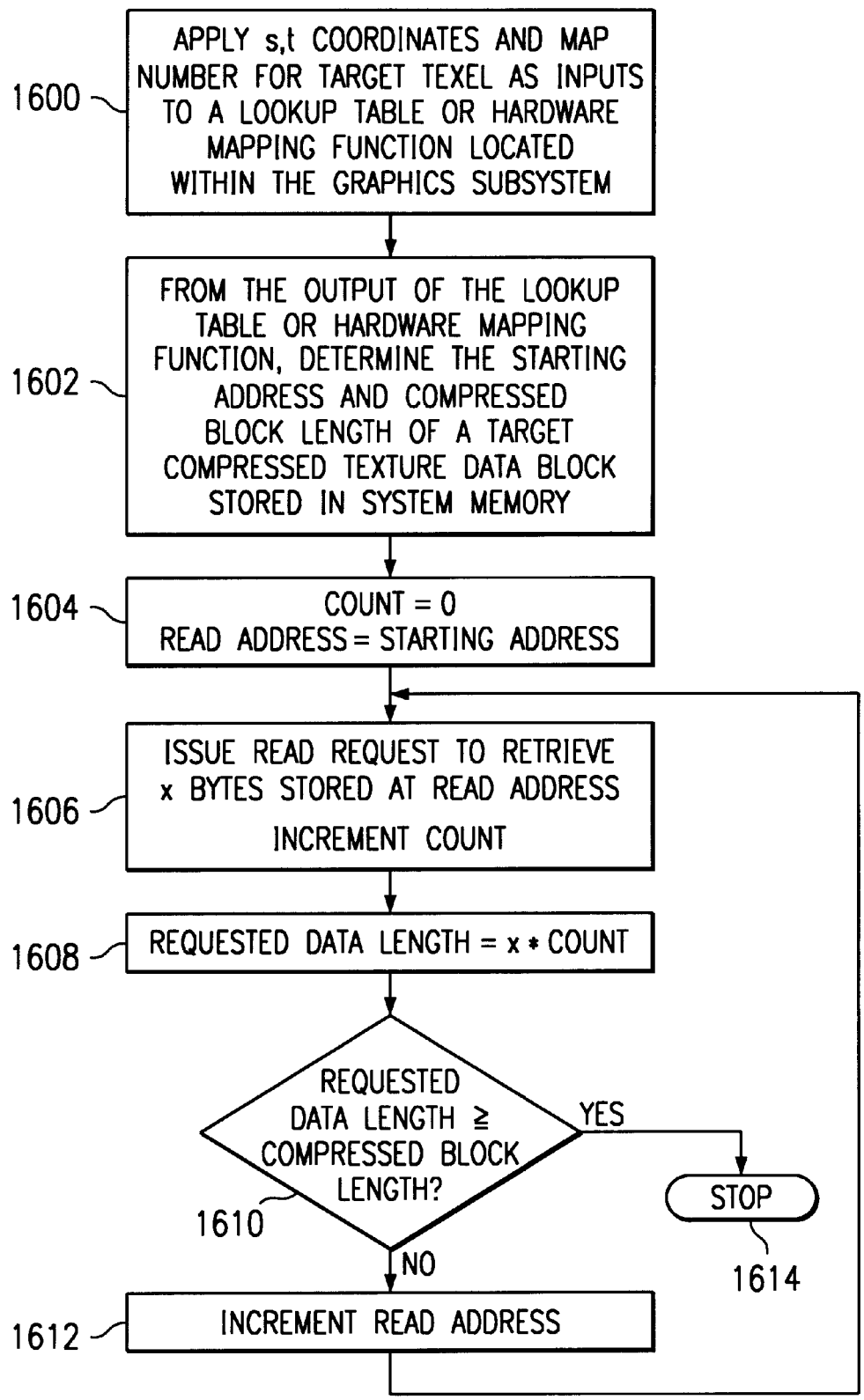
FIG. 16 is a flow diagram illustrating a sixth method of retrieving compressed texture data from a memory system according to a preferred embodiment of the invention.

10 System Bus Bandwidth-Efficient Method for Retrieval of Compressed Texture Data from System Memory Using Lookup Table or Hardware Mapping Function Located in Graphics Subsystem FIG. 16 illustrates an additional method for retrieving compressed texture data from system memory 104. The method of FIG. 16 makes use of the lookup table or hardware mapping functions located in graphics subsystem 116 and discussed above in relation to FIG. 3. In step 1600, the s,t coordinates and map number corresponding to a target texel are applied to the lookup table or hardware mapping functions stored in graphics subsystem 116. In step 1602, the starting address and length of a target compressed texture data block stored in system memory 104 are determined from the outputs of the lookup table or hardware mapping functions. (Note that, in the method of FIG. 16, the starting address refers to the starting address of a compressed texture data block directly, not to a segment that contains such a block.) In step 1604, a count is initialized to 0, and a read address value is initialized to the starting address determined in step 1602. Steps 1606, 1608, 1610 and 1612 represent the process of accessing the compressed texture data block (stored in system memory 104) that contains a compressed representation of the target texel. In step 1606, a read request is issued to retrieve x bytes of data stored at the read address, and the count is incremented. In step 1608, a requested data length value is calculated by multiplying x*count. In step 1610, the requested data length value is compared to the compressed block length determined in step 1602. If the requested data length is at least as large as the compressed block length, then the read request issuance operation may be stopped in step 1614. Otherwise, the read address is incremented appropriately in step 1612, and the process continues at step 1606. The method of FIG. 16 is system bus bandwidth efficient because system bus 110 need not used to determine the starting address and length of the target compressed texture data block prior to accessing it.

While the invention has been described in detail in relation to preferred embodiments thereof, the described embodiments have been presented by way of example and not by way of limitation. It will be understood by those skilled in the art that various changes may be made in the form and details of the described embodiments without deviating from the spirit and scope of the invention as defined by the appended claims. For example, all of the techniques described herein may be applied to three-dimensional texture maps. In order to use these techniques with three-dimensional texture maps, r,s,t coordinates may be used in lieu of s,t coordinates.

What is claimed is:

1. A method of retrieving a target unit of texture data from a memory system, comprising the steps of:
   determining a starting address of a target compressed texture data segment stored in said memory system, said target compressed texture data segment comprising a compressed representation of said target unit of texture data;
   starting a read request issuance operation, said read request issuance operation comprising issuing data read requests directed to addresses within said target compressed texture data segment beginning with said starting address;
   keeping a count of the total number of data read requests issued during said read request issuance operation;
   responsive to said count, determining a minimum uncompressed size, said minimum uncompressed size corresponding to a quantity of data that will be generated by said memory system responsive to said data read requests; and
   stopping said read request issuance operation when said minimum uncompressed size is at least as large as an expected uncompressed size.

2. A method of retrieving a target unit of texture data from a memory system according to claim 1, wherein:
   each of said data read requests is designed to retrieve an incremental quantity of data from said memory system, said incremental quantity of data having an incremental quantity size; and
   said step of determining a minimum uncompressed size comprises the steps of:
      first multiplying said incremental quantity size by said count; and
      multiplying the result of said first multiplying step by a worst case compression ratio.

3. A method of retrieving a target unit of texture data from a memory system according to claim 1, wherein:
   said expected uncompressed size is equal to a predetermined size of an uncompressed texture data block of an uncompressed texture map.

4. A method of retrieving a target unit of texture data from a memory system according to claim 1, wherein:
   said expected uncompressed size is determined responsive to an offset value, said offset value indicating the position of said target unit of texture data relative to the beginning of an uncompressed texture data block of an uncompressed texture map.

5. A method of retrieving a target unit of texture data from a memory system according to claim 1, wherein:
   said memory system contains a data structure comprising a plurality of compressed texture data segments, said plural compressed texture data segments comprising said target compressed texture data segment, each of said plural compressed texture data segments having the same segment length, and each of said plural compressed texture data segments comprising a compressed representation of an uncompressed block of texture data from an uncompressed texture map, said data structure beginning at a base address; and
   said step of determining a starting address comprises the steps of:
      determining a target segment number;
      multiplying said target segment number by said segment length; and
      adding the result of said multiplying step to said base address.

6. A method of retrieving a target unit of texture data from a memory system according to claim 5, wherein:
   said step of determining a target segment number comprises the steps of:
      determining a target block of said texture map that corresponds to said target unit of texture data; and
      determining which of said plural compressed texture data segments corresponds to said target block of said texture map.

7. A method of retrieving a target unit of texture data from a memory system according to claim 6, wherein:
   each of said blocks of said texture map has a block number;
   said step of determining a target block of said texture map comprises determining a target block number; and
   said step of determining a target segment number comprises equating said target segment number with said target block number.

8. A method of retrieving a target unit of texture data from a memory system, comprising the steps of:
   determining a starting address of a target compressed texture data segment stored in said memory system, said target compressed texture data segment comprising a compressed representation of said target unit of texture data;

starting a read request issuance operation, said read request issuance operation comprising issuing data read requests directed to addresses within said target compressed texture data segment beginning with said starting address, wherein each of said data read requests is designed to retrieve an incremental quantity of data from said memory system, said incremental quantity of data having an incremental quantity size;

keeping a count of the total number of data read requests issued during said read request issuance operation;

multiplying said incremental quantity size by said count; and stopping said read request issuance operation when the result of said multiplying step is at least as large as a maximum expected compressed texture data block size.

9. A method of retrieving a target unit of texture data from a memory system according to claim 8, wherein:

said maximum expected compressed texture data block size is equal to the size of said target compressed texture data segment.

10. A method of retrieving a target unit of texture data from a memory system according to claim 8, wherein:

said memory system contains a data structure comprising a plurality of compressed texture data segments, said plural compressed texture data segments comprising said target compressed texture data segment, each of said plural compressed texture data segments having the same segment length, and each of said plural compressed texture data segments comprising a compressed representation of an uncompressed block of texture data from an uncompressed texture map, said data structure beginning at a base address; and said step of determining a starting address comprises the steps of:
  determining a target segment number;
  multiplying said target segment number by said segment length; and
  adding the result of said multiplying step to said base address.

11. A method of retrieving a target unit of texture data from a memory system according to claim 10, wherein:

said step of determining a target segment number comprises the steps of:
  determining a target block of said texture map that corresponds to said target unit of texture data; and
  determining which of said plural compressed texture data segments corresponds to said target block of said texture map.

12. A method of retrieving a target unit of texture data from a memory system according to claim 11, wherein:

each of said blocks of said texture map has a block number;

said step of determining a target block of said texture map comprises determining a target block number; and said step of determining a target segment number comprises equating said target segment number with said target block number.

13. A method of retrieving a target unit of texture data from a memory system, comprising the steps of:

determining a starting address of a target compressed texture data segment stored in said memory system, said target compressed texture data segment comprising a compressed representation of said target unit of texture data;

starting a read request issuance operation, said read request issuance operation comprising issuing data read requests directed to addresses within said target compressed texture data segment beginning with said starting address;

receiving a quantity of data generated by said memory system responsive to said data read requests;

keeping an outstanding read count, said outstanding read count corresponding to a number of data read requests that have been issued during said read request issuance operation but for which data has not yet been received from said memory system; and stopping said read request issuance operation responsive to said outstanding read count and to information contained in said quantity of data.

14. A method of retrieving a target unit of texture data from a memory system according to claim 13, wherein said step of stopping said read request issuance operation responsive to said outstanding read count and to information contained in said quantity of data comprises the steps of:

responsive to said outstanding read count, determining a first minimum uncompressed size corresponding to the amount of data that has been requested but that has not yet been received from said memory system;

responsive to said information contained in said quantity of data, determining a second minimum uncompressed size corresponding to the amount of data that has already been received from said memory system; and stopping said read request issuance operation when the sum of said first and second minimum uncompressed sizes is at least as large as an expected uncompressed size.

15. A method of retrieving a target unit of texture data from a memory system according to claim 14, wherein:

said information contained in said quantity of data comprises a repetition indicator and an indicator of data that is to be repeated, said data that is to be repeated having a repeat data size; and said step of determining a second minimum uncompressed size comprises the steps of:
  interpreting said repetition indicator to determine a repetition number; and
  multiplying said repetition number by said repeat data size.

16. A method of retrieving a target unit of texture data from a memory system according to claim 14, wherein:

each of said data read requests is designed to retrieve an incremental quantity of data from said memory system, said incremental quantity of data having an incremental quantity size; and said step of determining a first minimum uncompressed size comprises the steps of:
  first multiplying said incremental quantity size by said outstanding read count; and
  multiplying the result of said first multiplying step by a worst case compression ratio.

17. A method of retrieving a target unit of texture data from a memory system according to claim 13, wherein:

said memory system contains a data structure comprising a plurality of compressed texture data segments, said plural compressed texture data segments comprising said target compressed texture data segment, each of said plural compressed texture data segments having the same segment length, and each of said plural compressed texture data segments comprising a compressed representation of an uncompressed block of texture data from an uncompressed texture map, said data structure beginning at a base address; and said step of determining a starting address comprises the steps of:
determining a target segment number;
multiplying said target segment number by said segment length; and
adding the result of said multiplying step to said base address.

18. A method of retrieving a target unit of texture data from a memory system according to claim 17, wherein:
said step of determining a target segment number comprises the steps of:
determining a target block of said texture map that corresponds to said target unit of texture data; and
determining which of said plural compressed texture data segments corresponds to said target block of said texture map.

19. A method of retrieving a target unit of texture data from a memory system according to claim 18, wherein:
each of said blocks of said texture map has a block number;
said step of determining a target block of said texture map comprises determining a target block number; and
said step of determining a target segment number comprises equating said target segment number with said target block number.

20. A method of retrieving a target unit of texture data from a memory system, comprising the steps of:
determining a starting address of a target compressed texture data segment stored in said memory system, said target compressed texture data segment comprising a compressed representation of said target unit of texture data;
starting a read request issuance operation, said read request issuance operation comprising issuing data read requests directed to addresses within said target compressed texture data segment beginning with said starting address;
receiving a quantity of data generated by said memory system responsive to said data read requests;
keeping a count of the total number of data read requests issued during said read request issuance operation; and
stopping said read request issuance operation responsive to said count and to first information contained in said quantity of data.

21. A method of retrieving a target unit of texture data from a memory system according to claim 20, wherein:
said target compressed texture data segment comprises a block of compressed texture data having a compressed block length;
said first information contained in said quantity of data comprises a length indicator field corresponding to said compressed block length; and
said step of stopping said read request issuance operation responsive to said count and to first information contained in said quantity of data comprises the steps of:
responsive to said length indicator field, determining said compressed block length;
responsive to said count, determining a requested data length corresponding to the total length of the data that has been requested during said read request issuance operation; and
stopping said read request issuance operation if said requested data length is at least as large as said compressed block length.

22. A method of retrieving a target unit of texture data from a memory system according to claim 20, wherein:
said memory system contains a data structure comprising a plurality of compressed texture data segments, said plural compressed texture data segments comprising said target compressed texture data segment, each of said plural compressed texture data segments having the same segment length, and each of said plural compressed texture data segments comprising a compressed representation of an uncompressed block of texture data from an uncompressed texture map, said data structure beginning at a base address; and
said step of determining a starting address comprises the steps of:
determining a target segment number;
multiplying said target segment number by said segment length; and
adding the result of said multiplying step to said base address.

23. A method of retrieving a target unit of texture data from a memory system according to claim 22, wherein:
said step of determining a target segment number comprises the steps of:
determining a target block of said texture map that corresponds to said target unit of texture data; and
determining which of said plural compressed texture data segments corresponds to said target block of said texture map.

24. A method of retrieving a target unit of texture data from a memory system according to claim 23, wherein:
each of said blocks of said texture map has a block number;
said step of determining a target block of said texture map comprises determining a target block number; and
said step of determining a target segment number comprises equating said target segment number with said target block number.

25. A method of retrieving a target unit of texture data from a memory system according to claim 20, further comprising the step of:
decompressing at least a portion of said quantity of data responsive to second information contained in said quantity of data, said second information indicating a type of decompression algorithm that should be used to perform said decompressing step.

26. A method of retrieving a target unit of texture data from a memory system, comprising the steps of:
determining a starting address of a target compressed texture data segment stored in said memory system, said target compressed texture data segment comprising a compressed representation of said target unit of texture data;
starting a read request issuance operation, said read request issuance operation comprising issuing data read requests directed to addresses within said target compressed texture data segment beginning with said starting address;
receiving a quantity of data generated by said memory system responsive to said data read requests;
while said read request issuance operation is still in progress, decompressing at least a portion of said quantity of data to produce uncompressed data having an uncompressed data size; and
stopping said read request issuance operation when said uncompressed data size is at least as large as an expected uncompressed data size.

27. A method of retrieving a target unit of texture data from a memory system according to claim 26, wherein:

said memory system contains a data structure comprising a plurality of compressed texture data segments, said plural compressed texture data segments comprising said target compressed texture data segment, each of said plural compressed texture data segments having the same segment length, and each of said plural compressed texture data segments comprising a compressed representation of an uncompressed block of texture data from an uncompressed texture map, said data structure beginning at a base address; and said step of determining a starting address comprises the steps of:
determining a target segment number;
multiplying said target segment number by said segment length; and
adding the result of said multiplying step to said base address.

28. A method of retrieving a target unit of texture data from a memory system according to claim 27, wherein:

said step of determining a target segment number comprises the steps of:
determining a target block of said texture map that corresponds to said target unit of texture data; and
determining which of said plural compressed texture data segments corresponds to said target block of said texture map.

29. A method of retrieving a target unit of texture data from a memory system according to claim 28, wherein:

each of said blocks of said texture map has a block number;

said step of determining a target block of said texture map comprises determining a target block number; and said step of determining a target segment number comprises equating said target segment number with said target block number.

30. A method of retrieving a target unit of texture data from a memory system, comprising the steps of:

determining a starting address of a target compressed texture data segment stored in said memory system, said target compressed texture data segment comprising a compressed representation of said target unit of texture data;

starting a read request issuance operation, said read request issuance operation comprising issuing data read requests directed to addresses within said target compressed texture data segment beginning with said starting address;

receiving a quantity of data generated by said memory system responsive to said data read requests;

keeping an outstanding read count, said outstanding read count corresponding to a number of data read requests that have been issued during said read request issuance operation but for which data has not yet been received from said memory system; and stopping said read request issuance operation responsive to said outstanding read count and to an actual uncompressed size corresponding to said quantity of data.

31. A method of retrieving a target unit of texture data from a memory system according to claim 30, further comprising the step of:

while said read request issuance operation is still in progress, decompressing at least a portion of said quantity of data to produce uncompressed data, said actual uncompressed size equal to the size of said uncompressed data; and wherein said step of stopping said read request issuance operation comprises the steps of:
responsive to said outstanding read count, determining a minimum uncompressed size corresponding to the amount of data that has been requested but has not yet been received from said memory system; and
stopping said read request issuance operation when the sum of said actual uncompressed size and said minimum uncompressed size is at least as large as an expected uncompressed size.

32. A method of retrieving a target unit of texture data from a memory system according to claim 31, wherein:

each of said data read requests is designed to retrieve an incremental quantity of data from said memory system, said incremental quantity of data having an incremental quantity size; and said step of determining a minimum uncompressed size comprises the steps of:
multiplying said incremental quantity size by said outstanding read count; and
multiplying the result of said first multiplying step by a worst case compression ratio.

33. A method of retrieving a target unit of texture data from a memory system according to claim 30, wherein:

said memory system contains a data structure comprising a plurality of compressed texture data segments, said plural compressed texture data segments comprising said target compressed texture data segment, each of said plural compressed texture data segments having the same segment length, and each of said plural compressed texture data segments comprising a compressed representation of an uncompressed block of texture data from an uncompressed texture map, said data structure beginning at a base address; and said step of determining a starting address comprises the steps of:
determining a target segment number;
multiplying said target segment number by said segment length; and
adding the result of said multiplying step to said base address.

34. A method of retrieving a target unit of texture data from a memory system according to claim 33, wherein:

said step of determining a target segment number comprises the steps of:
determining a target block of said texture map that corresponds to said target unit of texture data; and
determining which of said plural compressed texture data segments corresponds to said target block of said texture map.

35. A method of retrieving a target unit of texture data from a memory system according to claim 34, wherein:

each of said blocks of said texture map has a block number;

said step of determining a target block of said texture map comprises determining a target block number; and said step of determining a target segment number comprises equating said target segment number with said target block number.

36. A method of retrieving a target unit of texture data from a memory system, comprising the steps of:

accessing a mapping function located within a graphics subsystem to determine a starting address and a block length, said starting address and said block length corresponding to a compressed texture data block that is stored in said memory system and that contains a compressed representation of said target unit of texture data;

starting a read request issuance operation, said read request issuance operation comprising issuing data read requests directed to addresses within said compressed texture data block beginning with said starting address, wherein each of said data read requests is designed to retrieve an incremental quantity of data from said memory system, said incremental quantity of data having an incremental quantity size;

keeping a count of the total number of data read requests issued during said read request issuance operation;

multiplying said incremental quantity size by said count; and stopping said read request issuance operation when the result of said multiplying step is at least as large as said block length.

37. A method of retrieving a target unit of texture data from a memory system according to claim 36, wherein:

said step of accessing a mapping function comprises applying s,t coordinates and a map number corresponding to said target unit of texture data to a lookup table located in said graphics subsystem.

38. A method of retrieving a target unit of texture data from a memory system according to claim 36, wherein:

said step of accessing a mapping function comprises applying s,t coordinates and a map number corresponding to said target unit of texture data to a hardware mapping function located in said graphics subsystem.

39. A method of retrieving a target unit of texture data from a memory system according to claim 36, wherein:

said memory system is a system memory of a host computer system; and each of said read requests is issued to said system memory using a system bus.

* * * * *